Dec. 15, 1925.
1,565,658
R. LIEBAU
AIR SPRING SUSPENSION
Filed Feb. 26, 1919
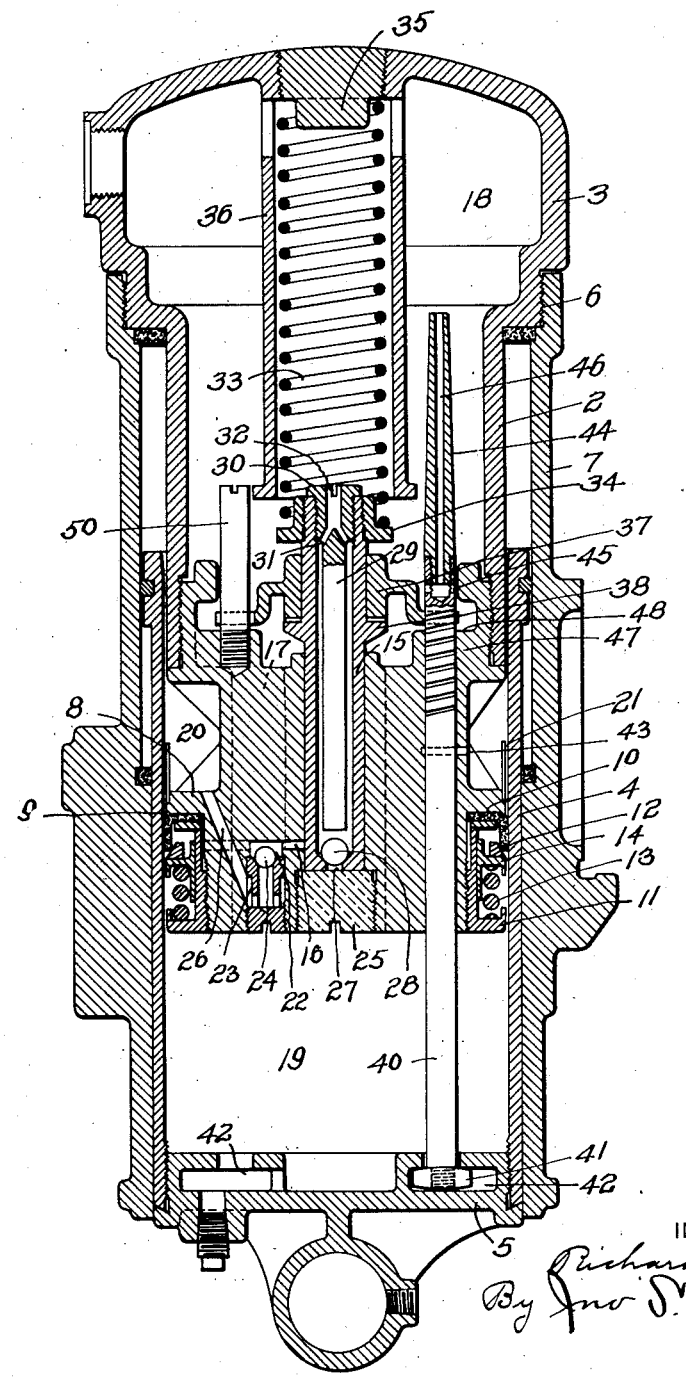
INVENTOR.
Richard Liebau
By Jno. S. Green.
HIS ATTORNEY IN FACT Patented Dec. 15, 1925.

1,565,658

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AIR-SPRING SUSPENSION.

Application filed February 26, 1919. Serial No. 279,434.

*To all whom it may concern:*

Be it known that I, RICHARD LIEBAU, a citizen of the United States, and a resident of New Haven, in the county of New Haven and State of Connecticut, have made a new and useful Invention in Air-Spring Suspensions, of which the following is a specification.

This invention relates to air springs of the type set forth in several applications for patents filed by me and Letters Patent No. 1,036,043 issued to George Westinghouse on August 20th, 1912.

In the present application, as in the former applications and patent, the invention is embodied in a fluid-compression device adapted for use as a compression spring broadly applicable in any relation where two bodies are so associated that resilient support of one is desirable, and the general object in view in this, as in said former applications and patent, has been to embody the principle of resilient support by an elastic compression medium such as air, or gas in a commercially practical, self-contained, air-tight compression device adapted to serve all of the purposes and functions of a spring.

My present invention also resembles that of the said former applications and patent in so far as a fluid-tight joint between the sliding surfaces of the device is maintained by means of a liquid bath.

According to the present invention, which is broadly applicable for use as a spring for motor vehicles such as automobiles, (and which hereinafter without any idea of limiting the invention will be referred to as an air spring), means are provided for forcing air into the compression chamber of the spring, for automatically determining the normal or operative relative positions of the relatively movable members of the spring irrespective of the load carried thereby and for transferring the sealing liquid forming the bath for the sliding joint from a collecting chamber on the low pressure side of the sliding joint to the compression chamber.

The drawing is a sectional elevation of an air spring embodying this invention.

In the device the cushion or compression chamber is made up of a cylinder 2 provided with a head 3 formed integrally therewith. Cylinder 2 telescopes within a cylinder 4 having a bottom 5 threaded thereinto. Secured to head 3 at 6 is an outer cylinder 7 which serves as a cover or mud and dust guard and as a guide for cylinder 4.

Threaded into the lower end of cylinder 2 is a plunger head 8 which carries a cup-leather packing 9 for the telescoping or sliding joint between cylinders 2 and 4. A seat 10 is formed for the cupleather packing and said packing is firmly held to its seat by means of a nut 11 threaded to the lower end of the plunger head.

A cone expander ring 12 is pressed against the inner depending lip of the cupleather packing by means of a spring 13 which presses against an intermediate sliding centering member 14 interposed between the cone expander and the spring.

At its center plunger head 8 is provided with a cylindrical bore formed for the reception of a pump plunger 15.

The central bore is closed at the bottom by means of a screw plug 25. Surrounding the central bore and extending through the plunger head from top to bottom are a number of circular channels 17 (shown by dotted lines).

These passages 17 place cushion chamber 18 in communication with chamber 19 of the spring; chamber 19 being located below the plunger head.

The plunger head is formed with an annular chamber 20 located above the cup leather packing and therefore on its low pressure side, a thin sheet metal band 21 surrounds the plunger head and with the lower part of the chamber 20 forms an annular receptacle for collecting any oil which leaks past the cup leather packing.

A chamber 22 is formed in the bottom of the plunger head and a valve cage 23 formed to snugly fit the bore of the chamber 22 is threaded thereinto.

A ball check valve 24 cooperates with a seat formed in the valve cage. A channel 16 places chamber 22 above ball check 24 in communication with the central bore of the plunger head which central bore forms a chamber for pump plunger 15.

Chamber 22 below ball check 24 is placed in communication with collecting chamber 20 by means of a duct 26. Pump plunger 15 is hollow and is provided with an inlet port 27 at its bottom, with which a ball check 28 cooperates. Ball check 28 is prevented from undue movement from its seat by means of a rod 29 which depends from a head 30 threaded into the upper end of the hollow pump plunger. Passages 31 are formed in the head 30 to permit the escape of fluid from the hollow pump plunger to the cushion chamber 18 through a central channel 32.

The pump plunger is normally held in the position shown in the drawings by means of a coil spring 33 one end of which bears against the head of cylinder 2 while the other end bears against a collar 34 threaded onto the outer end of the pump plunger.

A centering knob 35 is provided for the upper end of the coil spring and a cylindrical flange 36 depends from the head of cylinder 2 and surrounds spring 33.

Loosely mounted on the upper end of the pump plunger is a pump actuator 37. This pump actuator is allowed some movement independent of the pump plunger between the lower face of collar 34 and the upper face of a flange 38 formed on the pump plunger.

The fluid in surging from chamber 19 to chamber 18 through channel 17 in the plunger head upon collapsing movements of the air spring moves the actuator against the stress of spring 33 and lifts the pump plunger thereby sucking in oil from collecting chamber 20 past check valve 24 and when the pump plunger is forced to its seat by spring 33 the oil passes check valve 27 and enters the pump plunger from which when sufficient oil has collected therein it is forced into the cushion chamber.

The pump plunger is constructed so as to pump air as well as oil from chamber 20 to the interior or cushion chamber of the air spring and in order to prevent the air spring from extending beyond normal or mid position when at rest a bleeder device is provided for the purpose of bleeding out of the cushion chamber the excess air contained therein. The bleeder device consists of a rod 40 at its lower end carrying a nut 41 which lies within an annular retaining channel 42 formed in the cylinder bottom 5.

Rod 40 snugly fits a bore formed for that purpose which extends through the plunger head from the top to bottom and a duct 43 connects this bore with collecting chamber 20 which is maintained at substantially atmospheric pressure.

The upper end of rod 40 is drilled and tapped to receive a tapered tubular extension 44 and rod 40 immediately below the tubular extension is drilled through from side to side to present openings 45 which communicate with channel 46 of the tubular extension.

A spiral groove 47 is turned in the upper end of rod 40 and at its top communicates with one of the openings 45.

From this it will be seen that if the air spring is extended slightly beyond the position in which it is shown in the drawings a minute channel formed by the spiral groove and openings 45 will place the interior chamber of the air spring in communication with collecting chamber 20 through duct 43 which will then register with the spiral groove in rod 40.

When the air spring is in mid-position the bottom of the spiral groove stands about 5/8 inch above duct 43.

The tubular extension is provided in order that when opening 45 has passed down below upper face 48 of the plunger head fairly dry air will be blown off. If any oil is carried over with the air however it will be collected in collecting chamber 20 and pumped back into the interior of the air spring by the combined oil and air pump.

Rod 40 passes through a slot formed in pump actuator 37 and in order to prevent the side of the slot from wearing down rod 40 a guiding pin 50 secured to the plunger head passes through a slot formed for that purpose in the actuator. In this manner the actuator is prevented from turning and from wearing down rod 40.

When the air spring is collapsed the bleeder device is inoperative.

If the air spring has been subjected to a heavy load and with this load has stood in mid position when at rest it will immediately expand if the load is removed. This expansion will bring into play the bleeder device and the excess air, that is, more than that amount necessary to maintain the air spring in mid position under the new load, will be vented.

If now a heavy load is again placed on the spring and the vehicle on which the spring is installed is operated the extension and compression movements of the spring will cause the surging oil to operate the pump and the amount of air necessary to sustain the spring in mid position will be pumped into the cushion chamber of the device.

It will be seen that the air spring is automatic in its operation and with the bleeder device the air pump can be of much greater capacity than would be permissible if no bleeder device were provided.

Upon quick operations of the air spring such as occur when the vehicle is passing over rough and uneven road but slight amounts of air will be vented.

Having thus described my invention what I claim is—

1. In an air spring, relatively movable members having a sliding joint therebetween and forming a cushion chamber capable of extension and compression movements, a chamber for collecting the oil passing said joint, a pump operable upon compression and extension movements of said spring and constructed so as to function both as an air and as an oil pump for pumping air and oil from said collecting chamber to said cushion chamber, and means including a minute spiral channel for bleeding air from said cushion chamber upon abnormal extension movements of said spring.

2. In an air spring, relatively movable members having a sliding joint therebetween and forming a cushion chamber capable of extension and compression movements, a chamber for collecting the oil passing said joint, a pump operable upon compression and extension movements of said spring and constructed so as to function both as an air and as an oil pump for pumping air and oil from said collecting chamber to said cushion chamber, and means including a minute spiral channel for automatically venting said cushion chamber upon abnormal increase in the volumetric capacity thereof.

3. In an air spring, relatively movable members having a sliding joint therebetween and forming a cushion chamber, a packing for said joint, a chamber for collecting oil passing said packing, a pump operable upon extension and compression movements of said spring and constructed so as to function both as an air and as an oil pump and having its inlet connected to said collecting chamber and means including a minute spiral channel for automatically bleeding air from said cushion chamber upon abnormal extension movements of said air spring.

In testimony whereof, I have hereunto subscribed my name this 2nd day of December, 1918.

RICHARD LIEBAU.